(12) United States Patent
Chen et al.

(10) Patent No.: US 6,940,530 B2
(45) Date of Patent: Sep. 6, 2005

(54) DETERMINING MEANS, TERMINAL DEVICE, SYSTEM AND METHOD FOR POINT LABEL PLACEMENT ON A MAP

(75) Inventors: Ying Chen, Beijing (CN); Xiu Lan Yu, Beijing (CN); Fang Yan Rao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 10/442,022

(22) Filed: May 20, 2003

(65) Prior Publication Data

US 2004/0032417 A1 Feb. 19, 2004

(30) Foreign Application Priority Data

May 21, 2002 (CN) ......................................... 02120242 A (51) Int. Cl.[7] .................................................. G09G 5/00
(52) U.S. Cl. ...................... 345/660; 345/636; 345/629
(58) Field of Search ................................. 345/440, 629, 345/619, 660, 672, 665, 636, 680; 715/517; 703/2; 701/212

(56) References Cited

U.S. PATENT DOCUMENTS

| | | | | |
|---|---|---|---|---|
| 4,914,605 A | * | 4/1990 | Loughmiller et al. | 345/672 |
| 5,684,940 A | * | 11/1997 | Freeman et al. | 345/630 |
| 5,724,072 A | * | 3/1998 | Freeman et al. | 345/648 |
| 5,802,492 A | | 9/1998 | DeLorme et al. | |
| 6,091,424 A | * | 7/2000 | Madden et al. | 345/619 |
| 6,140,943 A | | 10/2000 | Levine | |
| 6,154,219 A | | 11/2000 | Wiley et al. | |
| 6,222,583 B1 | | 4/2001 | Matsumura et al. | |
| 6,424,933 B1 | * | 7/2002 | Agrawala et al. | 701/212 |
| 6,565,610 B1 | * | 5/2003 | Wang et al. | 345/619 |

OTHER PUBLICATIONS

Doddi, S. et al., "Map Labeling and Its Generalizations", Proceedings of the eighth annual ACM–SIAM symposium on Discrete algorithms, Jan. 1997, pp. 148–157.*

Kakoulis, K. & Tollis, I., "A Unified Approach to Labeling Graphical Features", Proceedings of the fourteenth annual symposium on Computational geometry, Jun. 1998, pp. 347–356.*

* cited by examiner

Primary Examiner—Sumati Lefkowitz
Assistant Examiner—Chante Harrison
(74) Attorney, Agent, or Firm—Louis P. Herzberg (57) ABSTRACT

Provides point label placement determining methods, apparatus and systems. A point label placement determining method and system are used in map browsing service based on session mode. In an example embodiment, initial label placement data in a scale is calculated by a static point label determining method. When a user requires a map browsing service, the requirement are met by using an incremental label placement method on the base of said initial label placement data. The incremental point label placement method dramatically reduces the cost for service process. Therefore, the simultaneous requirements of a large number of users can be met. The present invention is successfully used in location based service systems.

13 Claims, 11 Drawing Sheets

+ ROAL TIME ALGORTHM
* INCREMENTAL ALGORITHM

FIG.23

DETERMINING MEANS, TERMINAL DEVICE, SYSTEM AND METHOD FOR POINT LABEL PLACEMENT ON A MAP

FIELD OF THE INVENTION

The present invention relates to a system and method for point label placement on maps. Specifically, a determining means, terminal device, system and method for point label placement on maps of web geographical information systems.

BACKGROUND OF THE INVENTION

Figure 1:
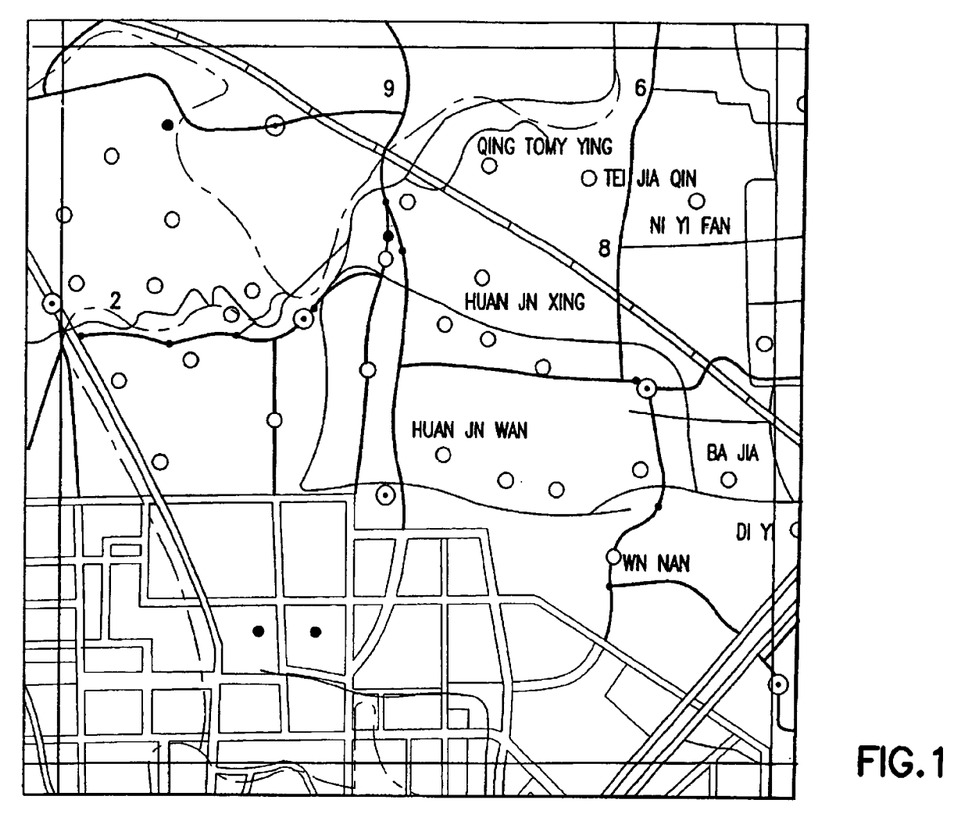
FIG. 1 shows a map, which is not in conformity with the request of point label.

Point labeling on maps is a traditional research topic. It's a classical problem to label points on maps in cartology and a key problem in geography information system. What is the so-called point labeling on maps? Try to put the corresponding names of cities on their right positions on a map of China, this process is called labeling. FIG. 1 shows a map of some region near Beijing(北京) 10, all the points on said map are labeled. However, the labeling results of the map is not an optimized solution. For example, the "西三旗" 20, on the up left corner, as well as the "大望京" 30 on the down right corner, should not be labeled since the points are not on the map and these two labels are meaningless; the label "安家坟" 40 lies near two points, and it is easy to lead to misunderstandings.

Figure 2:
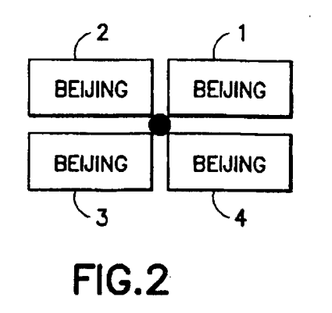
FIGS. 2 and 3 show possible candidate label positions.
Figure 3:
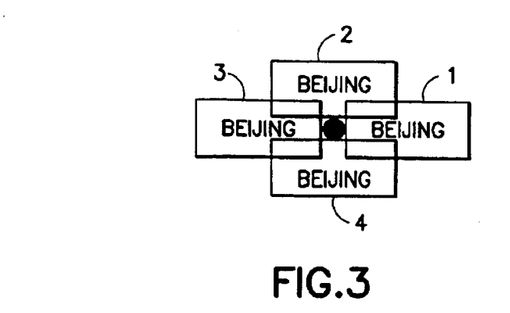

Generally speaking, labeling is used to help users understand the meaning of the corresponding point easily, thereby the label is generally very close to the point. And there are always many positions applicable. For example, there are four applicable positions called candidate label positions in FIG. 2 and FIG. 3 respectively. Obviously, there are many other candidate label positions too, such as the combination of candidate label positions in FIG. 2 and FIG. 3, or arbitrary slides and rotations of candidate label positions near the point, and so on.

Figure 4:
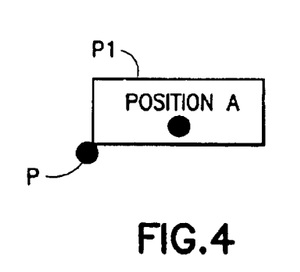
FIG. 4 shows the case that one point lies within the candidate label position of another point.
Figure 5:
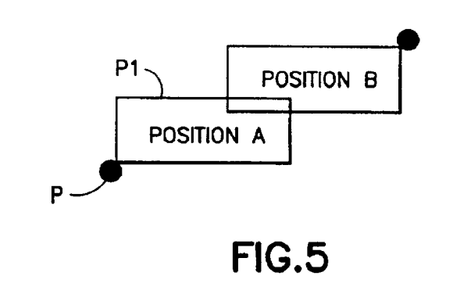
FIG. 5 shows the case that the candidate label positions of two points lap over.

After the candidate label set of points is determined, choices of different label positions should coincide with certain viewpoints of aesthetics. For example, in FIG. 2, the visual comfort index decreases in the sequence of position 1, 2, 3 and 4. Therefore, if possible, the position with high visual comfort index should be chosen, which means different candidate positions have different priorities when labeling points on maps. This is possible by referring to the cases showed in FIGS. 4 and 5: if P1, a candidate label position of point P have some other points (FIG. 4), or the position has been determined by other points as a label position (FIG. 5), labeling point P on the position of P1 definitely leads to misunderstanding when displaying. Therefore, when evaluating a method for determining point label position on maps, the criterion should include labeling as many points as possible without overlap and meeting the requirements of aesthetics as well.

When browsing a map on computer, the point label is usually needed for helping understanding contents of the map. For example, there are coordinates (e.g. longitudes and latitudes) and contents of map points (that is, their labels) stored in geographical information systems. When displaying the map in a computer, the position and the rectangle size (that the widths and the lengths of the rectangles in FIG. 2 to FIG. 5) of the point label can be determined according to contents of map points, the display scale and the size of monitor users defined in advance. After the label positions of each point according to rules of point labeling, the points and the contents thereof on the map can be well displayed on the computer screen.

Figure 6:
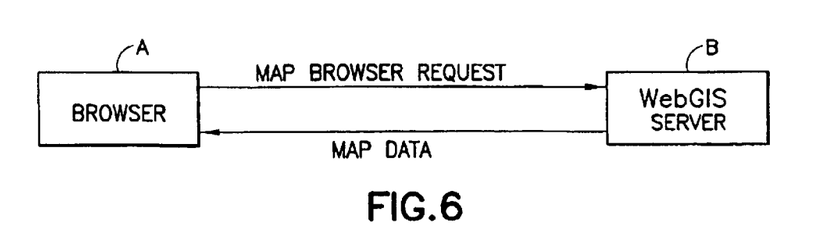
FIG. 6 shows a simplified model of WebGIS map browsing service.

FIG. 6 shows a simplified model of WebGIS map browsing service of the present invention. In FIG. 6, browser A sends a request to WebGIS server B for browsing a map. After receiving the request, the WebGIS server B sends pertinent map data back to browser A.

When browsing the map through the network, taking the web geographical information system (WebGIS) as an example, the server in WebGIS is usually a computer with large storage capacity and excellent computing ability. Therefore, the geographical information is always stored in the server. Clients can be simple computers, mobile telephones, or PDAs and so on. The working pattern is as follows. A client requests for service from a server first, for example, displaying all the book stores near Tsinghua University with display scale S on the monitor whose width is W, and height, H. Then the server responses to request of the client by sending back the point positions, the point label positions and label contents after determining the position of points and points' labels according to the data supplied by the client on the client screen. Thereby all the bookstores near Tsinghua University will be displayed on the client side. This is a service application of single client. The server can deal with it in real time. The time needed for the server to determine the label position can be approximately ignored, and the time delay can be ignored on the client side as well. However, when a plurality of clients (such as 10,000 clients) apply for such services simultaneously, the time needed for determining the label position by the server cannot be ignored. This will lead to the case in which, the client cannot receive the response for a long time after applying for the service, and the quality of service will be decreased as well.

Figure 7:
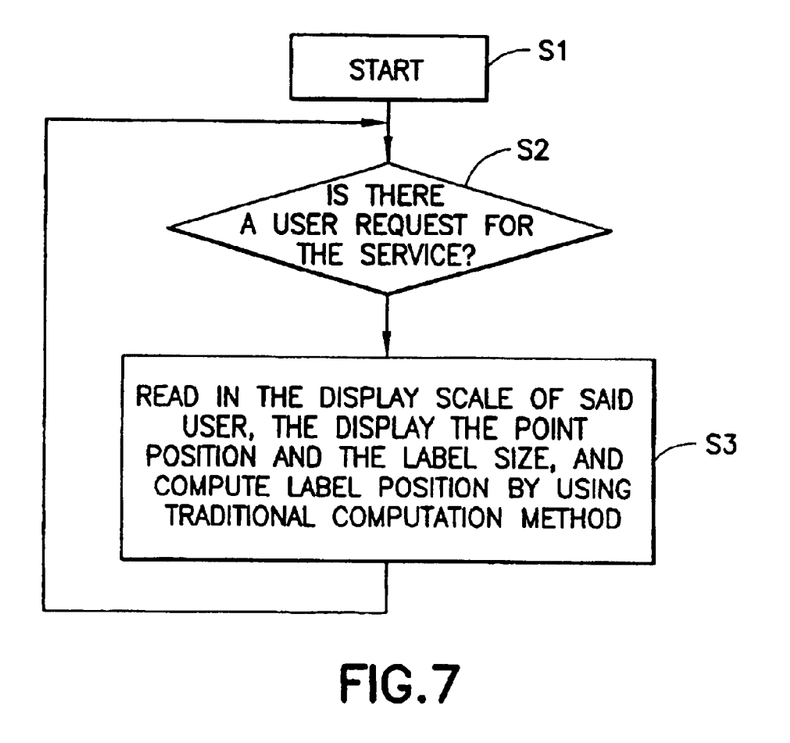
FIG. 7 shows a general operation flow chart of a server.

FIG. 7 shows a general working flow chart of WebGIS server. As shown in the drawings, it starts at Step S1, and waits for a users' request at Step S2. Then goes to Step S3 if there is a service request sent by a user. It reads in the display scale, point positions and size of label of the user, determining the label positions with traditional methods, and sends the determined result back to the user.

In traditional point labeling methods, the research target of map point labeling is the point set in a given area as well as the candidate label position set of each point. The candidate label position set of the unlabeled points can be classified into two categories:

1. Limited candidate label positions;
2. Unlimited sliding label positions.

No matter how large the number of the candidate label set is, the label determining method has been proved to be a NP problem. Example of point label methods that have been disclosed include: Expert System, Simulated Annealing method, Greedy method, Discrete Gradient method, Exhaustive Search method, Heuristic Method, etc. According to the research results of Jon Christonson et al., the way of point label with the best quality is the one of Simulated Annealing. Its label efficiency has priority to that of Exhaustive Search, Greedy, Discrete Gradient, and so on. However, the time consumption of Simulated Annealing is great.

When browsing maps on the web, under a certain label quality, users care more about the label efficiency, that is, the time complexity of the point label determine method. Especially in the pop Location-based Services (LBS) in WebGIS, it is possible for a large number of people to apply for the service of browsing the same map at the same time. This is a challenge to the capability of the map label determining method. And great effort is needed to smooth the system and the method for determining map point label on the web.

By far a better heuristic way for determining point label used on web is the one provided by Wagner (cf: Frank Wagner, Alexander Wolff, Vikas Kapoor and Tycho Strijk. Three rules suffice for good label placement. Algorithmica Special Issue on GIS, 2000. http://www.math-inf.uni-greifswald.de/map-labeling/bibliography, the following is called reference 1). While using the point label determining method to determine point label position on WebGIS map in real time, the time needed for determining can be largely reduced with little loss of labeling efficiency compared with Simulated Annealing methods.

LBS is generally used in urban areas where the population densities are always high and the activity areas of human being are relatively concentrated. It is obvious that, the displayed map areas which users care for are identical with the activity areas. When different users apply for the service of point label of local area, there are a larger number of area overlaps in multi-user service requests. If each user obtains label positions via real-time determining, the repeated determination will consume much time of the server; furthermore, when the number of points through real-time determining is large, the determining time needed for a single user cannot be ignored. A similar problem lies in other maps browsing services through networks, such as browsing the distribution of electronic components on circuit board stored in servers via networks, and so on.

The long time consumption in real-time computation indicates that a point label result of certain area can be pre-determined with certain display scale and stored in the server in advance. When users request for map displaying service (label), they only need to recall the results in the server, and this can save much time. However, when the display scale is changed, it will lead to label overlaps, the deduction of labeling efficiency, etc, though simple recall stories in the server.

SUMMARY OF THE INVENTION

As far as the shortcomings of above methods for determining point label position concerned, one aspect of the present invention is to provide means, a terminal unit, systems and methods for determining point label positions when browsing maps through network.

The point label in WebGIS is taken as an example as follows, and the process is similar to the point label of other map systems. In the typical interaction process of WebGIS, maps share much relevancy with each other. For example, when the scale of the current map is increased, the content of the new map comprises that of the old one. Based on this kind of relevancy and the demands of WebGIS applications, the present invention especially provides a method for determining the increment of point label position on the map used in WebGIS. After describing the point label problem, a method for determining map point static label in integrated area stored in the server under a certain scale is given first. Then an incremental method for determining the label positions of local area points based on the initial label results in the server is provided.

According to a first aspect of the present invention, there is provided a method for determining point label position on a map in a network system, comprising point label position determining means, a terminal unit and a communication link between them, the terminal unit sends the map display service request to the point label position determining means with a specific display scale via the communication links. Then the point label position determining means sends back map information with specific display scale to the terminal unit for displaying.

An example of the method comprises the following steps: saving one or more sets of static point label position results with one or more predetermined scales in the point label position determining means; comparing the request display scale with the predefined display scales on the point label position means when the terminal unit requests points and point label display services ; using the predetermined point label positions saved in point label position means if the display scale requested by the terminal unit is identical to a predetermined scale; determining new point label positions with the requested display scale using the incremental point label position determining method by the point label position determining means if the requested display scale of the terminal unit is different from any predetermined scales of the saved static point label positions, and sending the determined label positions to the terminal unit.

According to another aspect of the present invention, there is a system for determining points label positions on a map. An example system comprising a point label position determining means, a terminal unit and a communication link between the point label position determining means and the terminal unit, wherein the system further comprising: storage means for storing the data of static point label positions of the map with one or more predetermined scales; and comparing means for comparing a requested display scales of the terminal unit with the predetermined scales; selecting means for selecting an appropriate predetermined scale as the base for incremental label position determining method; determining means connected with the storage means and the selecting means for incremental label position determining with the display scale that is different from the predetermined scales; communication interfaces used for data interchange among the terminal means via the communication link, wherein the terminal means further comprising: communication means for receiving point label request from terminal units and send back the point label position determining results via communication interfaces; storage means for saving the data from the point label position determining means in local storage; and display means for displaying the map points and their labels with requested display scale saved in the local storage.

Through applying the point label methods based on rules in the invention, the initial point label positions with certain display scales can be obtained first. When browsing the map, the user's requests for point labeling can be fulfilled through the increment label determining method. The incremental label determining method largely reduces the consumption of processing service, so as to meet the concurrent request of large number of users.

BRIEF DESCRIPTION OF THE DRAWINGS

According to the following, combined with the drawings, other aspects and advantages of the present invention will become clearer. The detailed description and specified examples are provided for illustration only. Those skilled in the art may add and improve these examples within the spirit and scope of the present invention.

DETAILED DESCRIPTION

In the following example, the server is set as the point label position determining means for determing the point label position.

Figure 8:
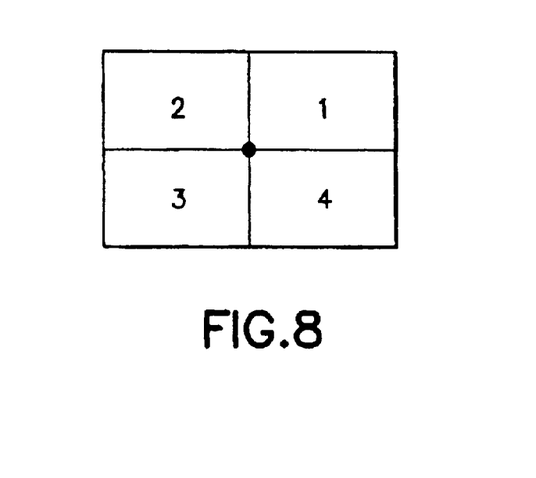
FIG. 8 shows the candidate label positions of one point for describing the point label problem.

Mathematical symbols used in the point labeling problem are described in the following:

Assuming that the size of label window R is W×H. $P=\{p_1, p_2, \ldots, p_n\}$ is unlabeled points set in 2-D space. The coordinate of $p_i$ is $(x_i, y_i)$, which meets the condition: $0 \leq x_i \leq W$, $0 \leq y_i \leq H$. Assuming that each point $p_i$ has four candidate label positions (1, 2, 3, 4). $C_i$ is the candidate label position set of $p_i$, here, unifying $C_i = C = \{1,2,3,4\}$, that is, using four rectangle label positions of symmetrical axis. As shown in FIG. 8, from the point of aesthetic, the four label positions of one point have different priorities. And the position, which has lower serial number, has higher priority in FIG. 8. These four rectangles are respectively expressed as $r_i^{(1)}$, $r_i^{(2)}$, $r_i^{(3)}$, $r_i^{(4)}$, the size of the label rectangle $r_i$ of point $p_i$ is $w_i \times h_i$. If meeting the condition: $r_1^{c_1} \cap r_2^{c_2} \neq \emptyset$, there is collision between two points $p_1$ and $p_2$ at $c_1, c_2$ ($\in C$) (that is, overlap).

One label result of P $L=\{(p_i, c_i) | i=1,2, \ldots, n, c_i \in C \cup \{0\}\}$ meets the following conditions:

1. No collisions. The formula is $\forall i, j=1,2, \ldots, n, i \neq j \rightarrow r_i^{(c_i)} \cap r_j^{(c_j)} = \emptyset$, wherein $c_i=0$ means the point is not labeled, the area of the corresponding rectangle $r_i^{(0)}$ is 0.

2. Limited area. Expressed as $r_i^{(c_i)} \subset R$, $i=1,2, \ldots, n$.

L is called optimized label result, if meeting the following condition:

3. There is no other label result L' of P, making $L \subset L'$ come to be true.

Two label results $L_1$ and $L_2$ meet the condition of $L_1 \subset L_2$, which is called that, $L_2$ is superior to $L_1$. The process from $L_1$ to $L_2$ is called the extension of $L_1$. It is obvious that, the optimized label result is obtained from the extension from some starting label result to a fixed point (a label result that cannot be extended any more). Furthermore, P may have multiple optimized results. The label number N(L) of the label result L is the number that $c_i$ is not 0 in L. It is obvious that, N(L) may be regarded as a criterion to weigh label quality. Therefore, different optimized results of P have different qualities. However, it is difficult to find out one optimized result, which has the highest quality from all the optimized label results (the NP hard problem). The point label determining method associated with the present invention requests as follows:

Input: W, H, $p_i$, $r_i (i=1,2, \ldots, n)$

Output: optimized label result L

There is no request for optimal solutions in the point label determining methods. Thereby the object of the determining method of the present invention is to improve the quality as much as possible under the WebGIS circumstance.

Figure 9:
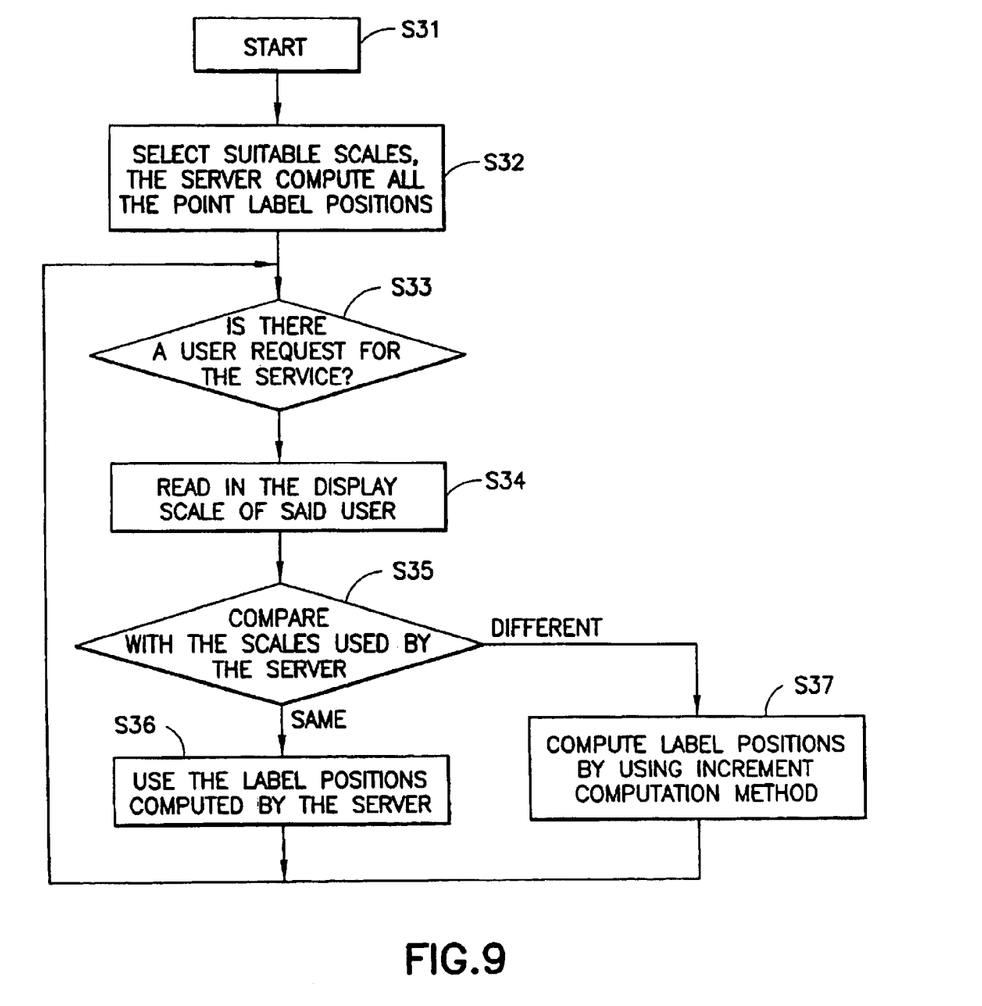
FIG. 9 shows an operation flow chart when using the increment determining method, according to an example of the present invention.

According to an example of the present invention, FIG. 9 shows that a working chart of the server when using the increment determining method, which comprises the following steps:

At Step S32, the server choosing the proper scales, determining all the point label positions using the static determining method of the present invention;

At Step S33, waiting for the service requests from users;

At Step S34, reading in the display scale of the user;

At Step S35, comparing the display scale read in here with the proper scales used by the server in predetermining the point label positions;

If the scales are the same, turning to Step S36, sending the positions predetermined by the server to the user;

If all scales are different, turning to Step S37, determining the label position using the increment determining method of the present invention, and sending the result to the user.

The static point label position determining method and the increment determining method used during the working period of the server are described respectively as follows:

Static Point Label Position Determining Method

Figure 10:
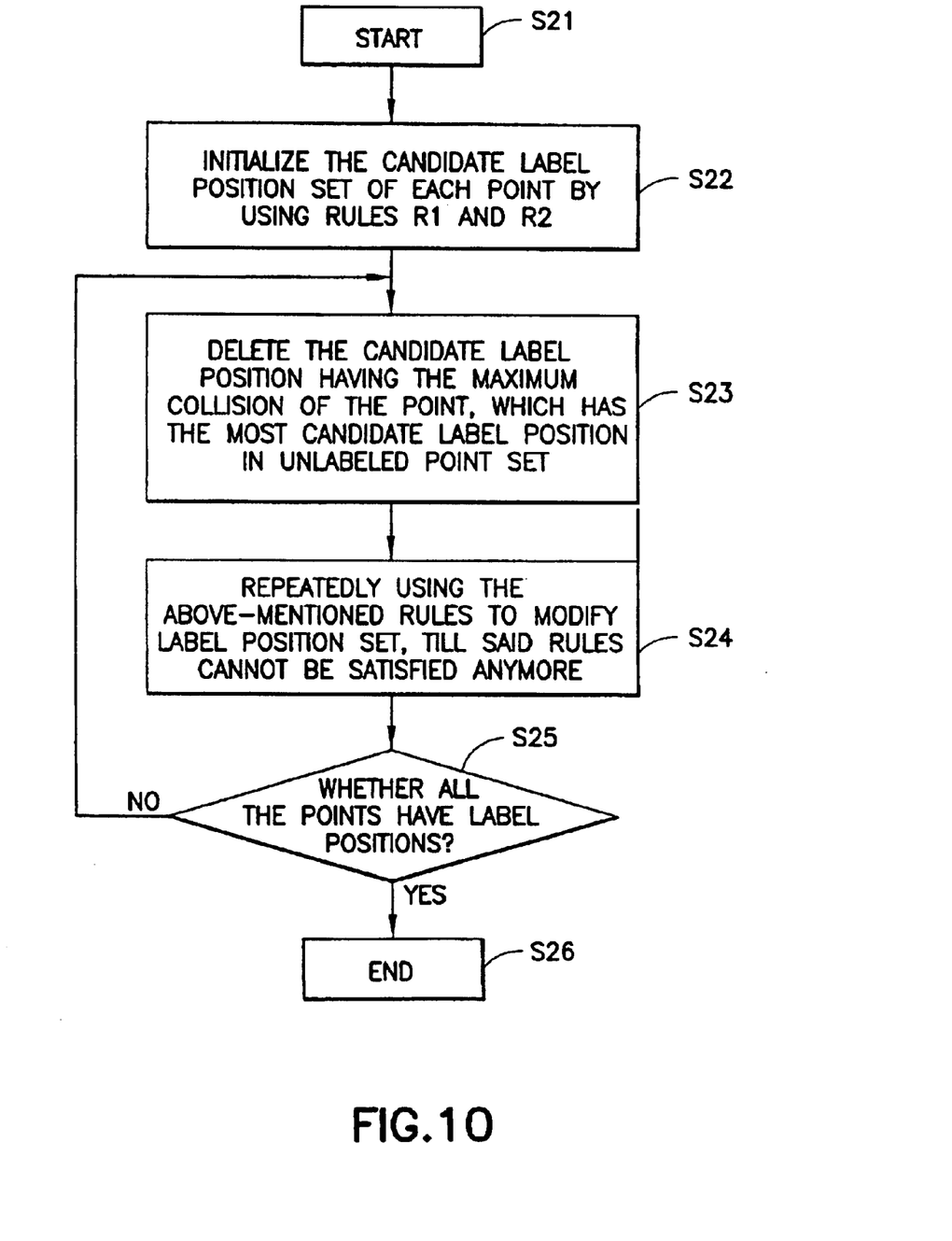
FIG. 10 shows an operation flow chart of the static determining method based on the present invention.

FIG. 10 shows the static point label position determining method based on the present invention. Because WebGIS requests high performance of the point label position determining method, the static label determining method of the present invention is similar to the revelatory method based on rules of Reference 1. Reference 1 uses a series of rules to reduce candidate label positions in the first phase, and obtains the optimized label result by revelatory rules in the second phase.

In order to accelerate the computation, besides the three rules in reference 1, we incorporate two additional rules for initiating the candidate label position of label point. Thereby, the whole point label position determining method can be divided into three phases:

The first is initial phase: initialize the candidate label position of each point with rule R1 and R2 (Step S22);

1. Rule R1: the rule of limited area. If $r_i^{(j)} \not\subset R$, the candidate position j is deleted from the candidate label set.

Figure 11:
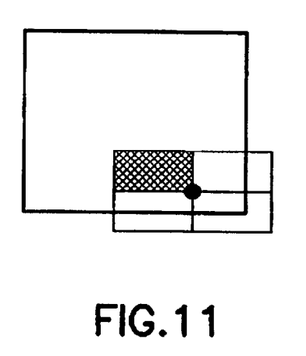
FIG. 11 shows a diagram of area-limited rules.

As shown in FIG. 11, wherein the gray part expresses the available label candidate positions. If the candidate position of one point goes beyond the label area, the candidate position will be canceled. Position 2 remained in FIG. 11 is the candidate label position, the other positions cannot be used.

Figure 12:
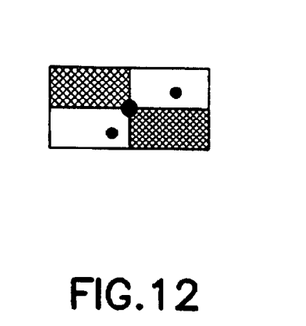
FIG. 12 shows a diagram of uncover rules.

2. Rule R2: the rule of non-overlap. If $\exists k, p_k \subset r_i^{(j)}$, the candidate position j is deleted from the candidate label set. As shown in FIG. 12, wherein the gray part expresses the available label candidate positions. If the candidate position of one point goes beyond the label area, the candidate position will be canceled. Positions 2 and 4 remained in FIG. 12 are the candidate label positions, the other positions cannot be used.

The incorporation of rules R1 and R2 leads to the deletion of unusable candidate label positions in a considerable measure, which reduces the successive processing time as well.

The second and the third phase correspond to the two phases of the determining method in reference 1. The difference lies in that all the collisions among candidate label positions are determined in real-time instead of directly inputted collision figures. The second phase uses rules R3–R5 (corresponding to rules L1–L3 in reference 1), labeling the points without collisions, and passing through all the points, until no point meeting R3–R5. The third phase searches the label positions of all the points unlabeled, finds out the points having the most candidate positions, and deletes the candidate label positions of the points having the most collision (step S23); applies R3–R5 again. Repeating the process above till all the points labeled or unable to be labeled, that is, obtaining an optimized label result (step 24).

Figure 13:
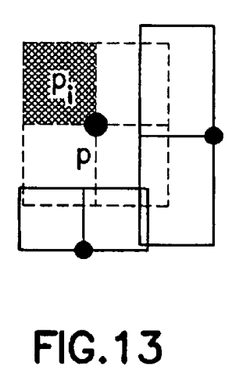
FIG. 13 shows a diagram of Rule R3.
Figure 14:
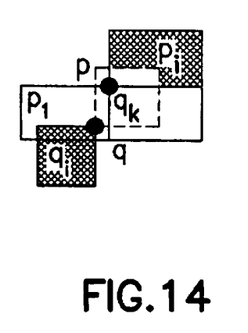
FIG. 14 shows a diagram of Rule R4.
Figure 15:
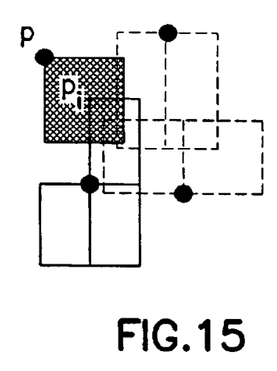
FIG. 15 shows a diagram of Rule R5.

The following is a brief description about rules R3–R5, according to FIGS. 13–15.

Rule R3: as shown in FIG. 13, if point p has a candidate label position $p_i$ without collisions with other label positions. Then $p_i$ is the label position of point p, delete other candidate label positions of point p;

Rule R4: as shown in FIG. 14, if point p has a candidate label position $p_i$, $p_i$ collides with only one candidate label position of point q, and point q has a candidate label position $q_j (j \neq k)$ which only overlaps candidate label position $p_l (l \neq i)$ of point p. $p_i$ and $q_j$ are respectively the label positions of points p and q, delete other candidate label positions of points p and q;

Rule R5: as shown in FIG. 15, if there is only one candidate label position $p_i$ of point p, delete the candidate label positions which collide with $p_i$. And $p_i$ is the label position of point p.

The pseudo code of determining method is shown as follows. Line 9 determines the adjacent area of point p, the size thereof is determined by the maximal label width and height which are determined in line 2. The modifications of candidate label of point p lead to the re-employ of rules R3, R4 and R5 to the adjacent area.

The pseudocode of the static point label position determining method is the following:

PointLabel($W_i$, $H_i$, $p_i$, $r_i$(i = 1, 2, . . . , n)) ; $W_i$ is the width of label frame of point i, $H_i$ is the width of label frame of point i, $p_i$ is the coordinate of point i, $r_i$ is the radius of point i // Phase One
1. L←∅; L is the label set, initializing L into NULL set, that is, the point label positions of all points are not determined.
2.

$$w_{max} \leftarrow \max_{i=1}^{n}(w_i), h_{max} \leftarrow \max_{i=1}^{n}(h_i),$$

determining the maximum widths and maximum heights of all point labels, quadruple of which are the width and height of the collision area.
3. Using rules R1 and R2 to initialize the candidate label set of point $p_i$, and modifying L
// Phase Two
4. Using rules R3, R4 and R5 to modify the candidate label set of for all $p_i$, and modifying L
// Phase Three
5. Repeating
6. p← the point which has most candidate label positions in unlabeled point set
7. c←p the candidate label which has most collision in candidate label set
8. Deleting c
9. Γ← a rectangle in which p is central point, the width and height are respectively $4 \times w_{max}$ and $4 \times h_{max}$; depositing the points in small collision area
10. Using R3, R4 and R5 to the points unlabeled in Γ, and modifying L
11. Till L can not be modified any more
12. Output L
Increment Point Label Position Determining Method Though the label efficiency in the above-mentioned point label determining method is slightly lower than that of Simulated Annealing method, from the viewpoint of time consumption, the determining method has much advantage. However, when the number of points is large, and there are many users applying for the service, it will take much time to determine the point label positions in real time by means of the determining method. Concerning the service based on locations, the places in which many users take activities are fixed (for example, in certain cities). We may use the above-mentioned determining method to determine the global label position results with certain display scales in advance and save the results. Based on these results, the local area concerned by each user is a subset of the fixed areas. The point labels inside local area is a subset of the global label position results, in case that the scale is unchanged. If the scale of local area is changed, the point label positions of the area will be changed. The increment determining method of point label in local area, as follows, can be used to quickly determine point label results of local area, in case that the scale is unchanged or decreased (assuming that the size of label will not change with the scale).

The pseudocode of the increment determining method can be written down based on that of the static point label position determining method mentioned above. In the following paragraph, the increment determining method of the present invention is characterized upon results of the static point label position determining method with FIG. 16.

Figure 16:
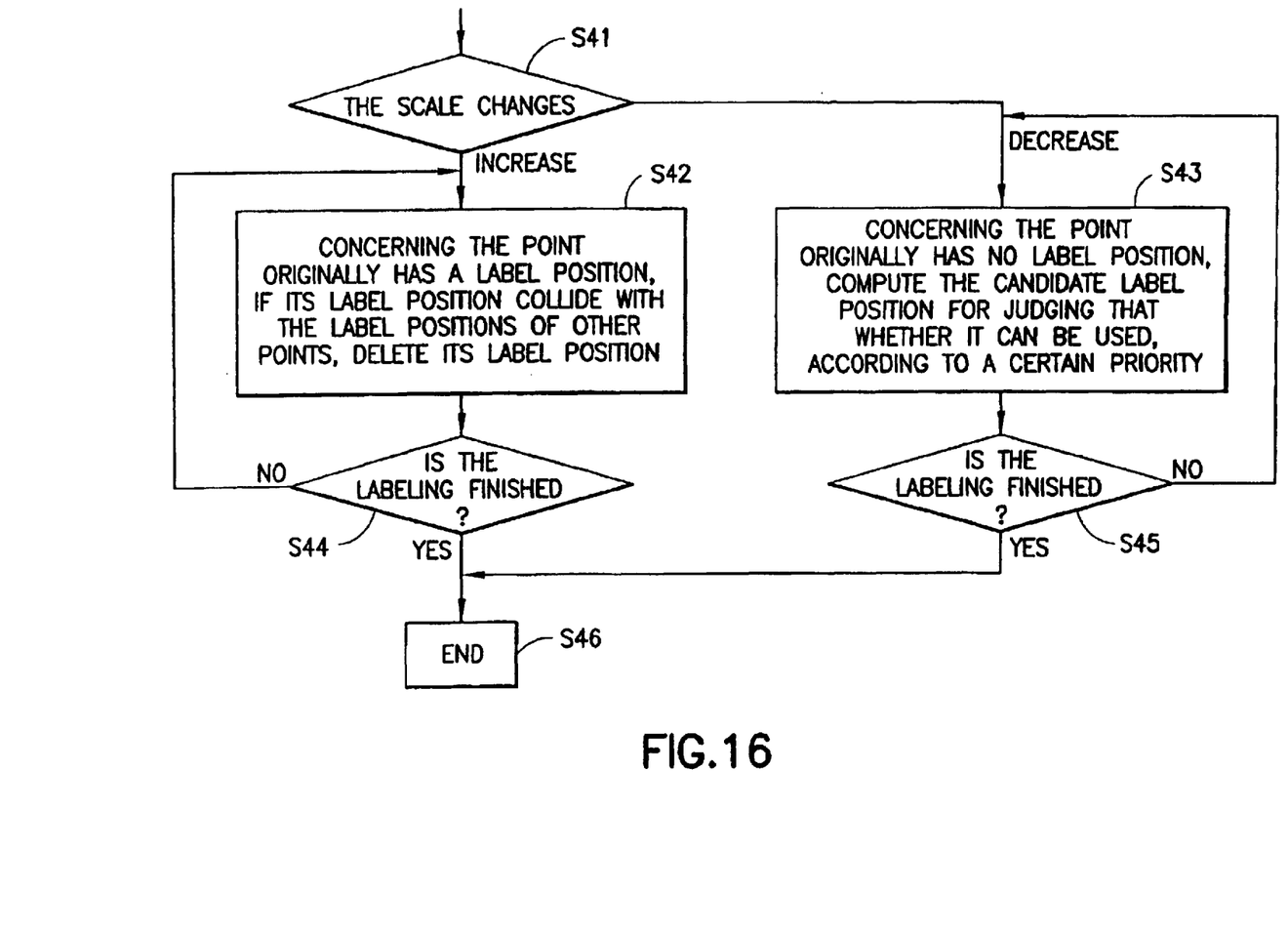
FIG. 16 shows a chart of increment determining method used by an example of the present invention.

FIG. 16 shows a flow chart of the increment determining method used by an example of the present invention. If the scale $\Phi$ requested by a user, is different from the scale S of the server used in predetermining label, determining that the scale $\Phi$ of the user is larger or smaller than S (step S41). Assuming that, L is an optimized label result of point set P of the whole area, which is obtained from the static determining method under the scale of S. In order to obtain the label result of sub-region R (a subset of P) with the scale $\Phi(\neq S)$, it can be divided into two cases, considering the relationships of $\Phi$ and S.

1. $\Phi > S$ (step S43). The increase in scale is equivelent to the Zoom In operation to the map, the displayed distance between opposite points becomes large, therefore the number of labeled points is no less than L. Then point P in sub-region can be divided into three cases according the label position C:

(I) c>0 and $r^{(c)} \subset R$. That is, the label position lies inside the sub-region, adding (p, c') in L($\Phi$);

(II) c>0 and $r^{(c)} \not\subset R$. That is the label position partly lies outside the sub-region. Replacing the other candidate label positions of P one by one in a sequence of priority. If some new candidate label position c' meets R1 and R2, and takes no effect on the label position of adjacent area point in L, then adding (p, c') into L($\Phi$); otherwise, adding (p,0) into L($\Phi$) (unlabeled);

(III) c=0. Because the point, which cannot be labeled under original scale, can probably be labeled under new scale, then labeling by the method similar to (II).

2. $\Phi < S$ (step S42). The decrease of scale is equivelent to the Zoom Out operation to the map, the displayed distance between opposite points becomes small, the point which can be labeled will probably become unlabeled. Therefore, the static determining method should be applied to the labeled points in L. However, in practice, when the scale decreases, grade labeling should be put into consideration, so as to avoid the case that, there are full of points inside the displayed area, while only a very few points can be labeled.

It is obvious that, the increment determining method largely reduces the determining time when the scale increases. Practically, the choice of initial scale S is very important, because it determines the scale range that can be used by the increment determining method. Therefore, it's due to the application demand. Concerning cases that the range of the scale variation is large, the method of multiple initial scales may be used, that is, determining the static label results with the scale $S_1, S_2, \ldots, S_M$, here the demand of initial results to storage should be put into consideration.

Here only an increment determining method is supplied. However, as long as the following functions can be fulfilled, other different increment determining method can be realized. On the basis of the label positions determined in advance of the server, after making sure about the changes of scales, judging whether there are points having no original label positions but being labeled now (the scale decreases); or originally having label positions, and no label positions now (the scale increases); there is no need for the increment determining method to pass through all the points, it reduces the determining time comparing with the traditional point label determining method. When large numbers of users request for service at the same time, the time that can be saved is considerable. The idea of the present invention lies in that, the increment determining method can be applied on the basis of static determining method, it is not limited to the specific increment point label determining method, the design of any increment point label determining method can fulfill this purpose.

Figure 17:
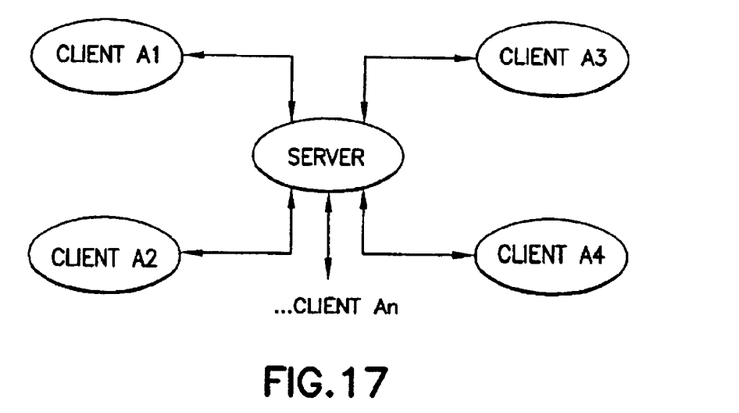
FIG. 17 shows a system for determining the label position of the present invention.
Figure 18:
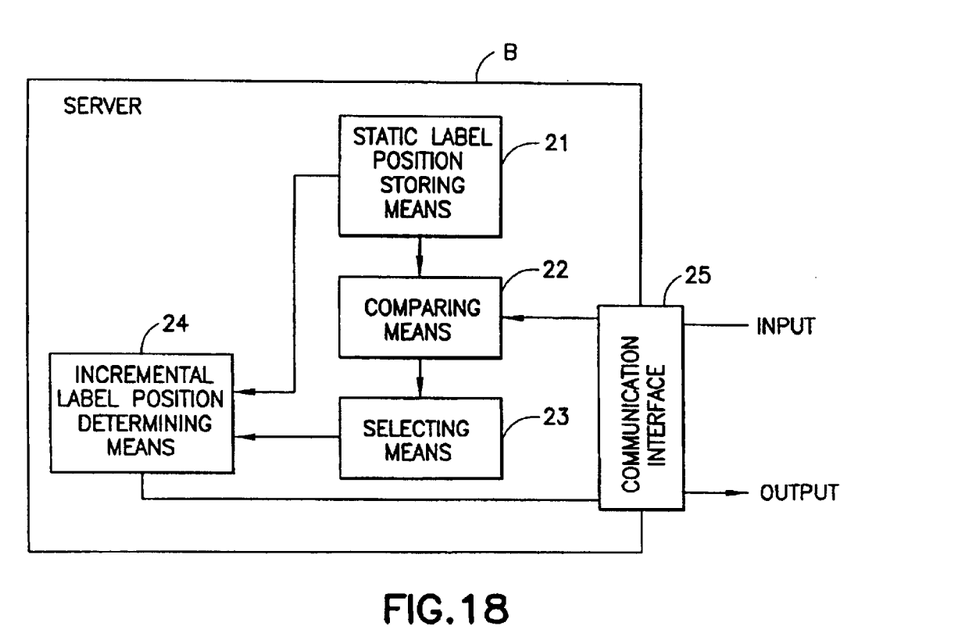
FIG. 18 shows relevant components for determining label position within the server in the label position determining system of the present invention.
Figure 19:
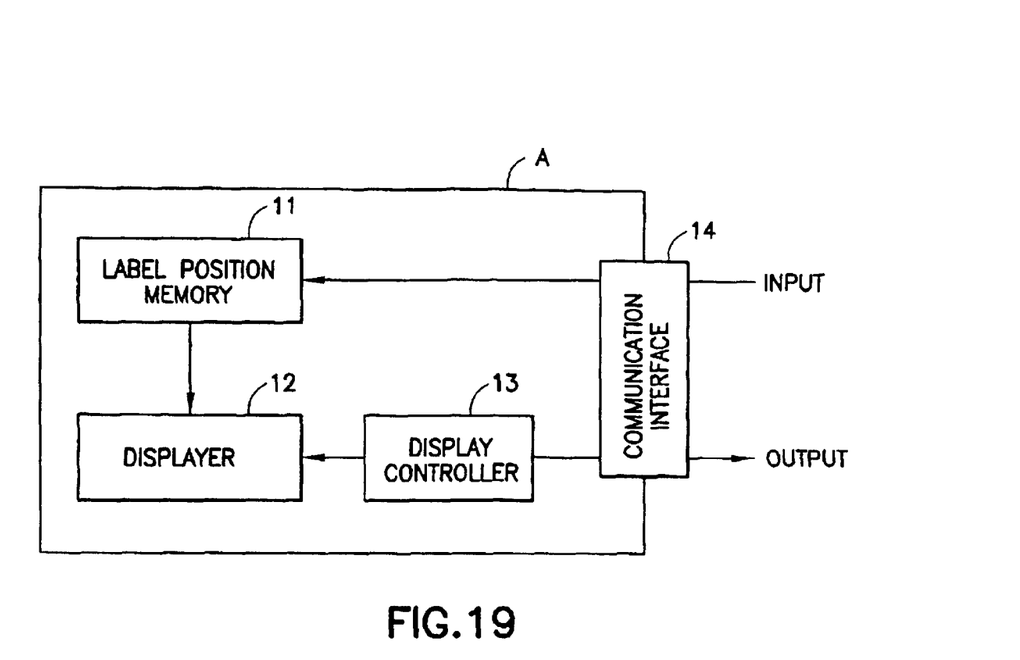
FIG. 19 shows relevant components of the client in the label position determining system of the present invention.

A system using the above-mentioned increment label determining method is described as follows. As shown in FIG. 17, a server B communicates with many clients A1, A2, ..., An. Client A may be a portable device, for example, a cellular phone, a palm computer, PDA, or a computer. Server B may be a computer or a professional device. Client A and server B communicate with each other by means of wire or wireless. As shown in FIG. 18, the server B comprises: static label storing means 21, for storing the point static label position data of the map under one or multiple predetermined scales; comparing means 22, for comparing the display scale of the client with the predetermined scales of the server; choosing means 23, for choosing proper predetermined scale as the base to determine increment label, according to compared results; increment label determining means 24, which connects with the means for storing static label position data and choosing means, according to the static label position data, determining the difference between label data and the static label position data under other scales except the predetermined scale; and communication interface 25, for connecting with the client via the communication chain, and exchanging data with the client. As shown in FIG. 19, the client A comprises: communication interface 14, for exchanging data with the server; label position storing means 11, for storing label position data from server; display controller 13, for sending absolute or relative display scales of monitor to server B via communication interface 14, requesting server for determining label position for display, and controlling monitor 12 to display based on the data from server B, when receiving determining label position results from server; monitor 12, for displaying the points of the map and the label thereof based on the scale indicated by client, according the label position data stored in the memory.

The display scale sent from client A to server B may be an absolute scale, or a relative one on the basis of former display scale. If what server B receives is a relative scale, the server B obtains the absolute scale requested by client A for display service by adding the relative scale to current display scale of the client, and processing as above according to the absolute scale.

Figure 20:
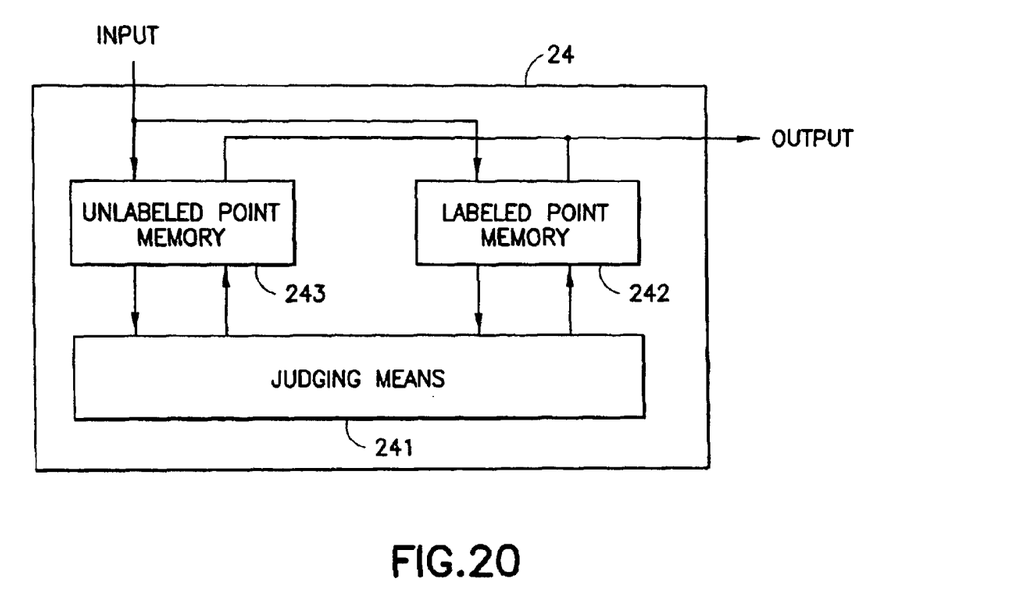
FIG. 20 shows a structure diagram of the increment label determining means within the server in the label position determining system of the present invention.

As shown in FIG. 20, the increment label determining means 24 comprises memory 243, for storing labeled points and label position set from static label storing means under predetermined scale, according to the predetermined scale chosen by the choosing means; and memory 242, for storing unlabeled point position set.

If comparing means 22 judges that the display scale is identical with a predetermined scale, the choosing means 23 chose the predetermined scale. If display scale is different from all predetermined scales, and there are predetermined scales smaller than the display scale, among them the maximum predetermined scale will be chosen, otherwise, the minimum predetermined scale will be chosen.

The increment label determining means 24 also comprises judging means 241, a. If the proper predetermined scale chosen by choosing means 23 is smaller than display scale, the judgment is:

a1) if one label position of one point lies inside the sub-region browsed by client, the label position will be added into memory 242 for storing labeled set;

a2) if one label position of one point lies outside the sub-region browsed by client, other candidate label positions of the point will be replaced one by one in the sequence of priority. If a certain new candidate label position does not go beyond the label area in which there is no other points, and takes no effect on the point label position of the adjacent area in the labeled label set, then the label position of the point will be added into memory 243 for storing labeled label set; otherwise the point will be added into memory 242 for storing unlabeled label set;

a3) for the unlabeled point under predetermined scale, its label position is determined by the steps in (a2) above;

b. If the display scale requested by the client is smaller than the predetermined scale, then the label position of the labeled points in the original labeled point memory should be determined by the static label position determining method.

The label data are respectively stored in unlabeled point memory and labeled point memory, with the display scale of client determined by the judgment of judging means 241, and the results are sent to the client for displaying via communication interface.

Experimental Data And Label Results

Experimental data comes from www.math.inf.uni-greifswald.de/map-labeling. Program language is JAVA, running under the circumstance of JDK on IBM Thinkpad 770ED. The scale of area when 80 percent of all point set can be labeled, is chosen as the scale S which determined the point label results stored in server.

Figure 21:
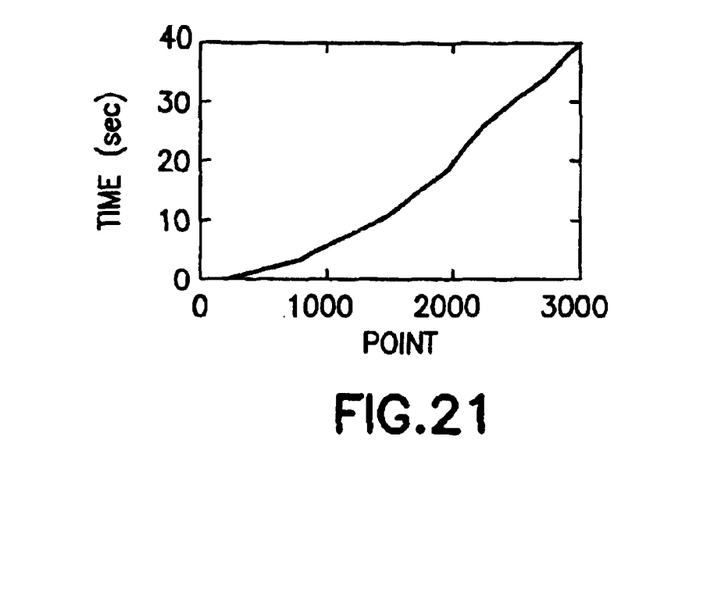
FIG. 21 is the relation curve of running time versus number of points in real-time determining method with display scale S.
Figure 22:
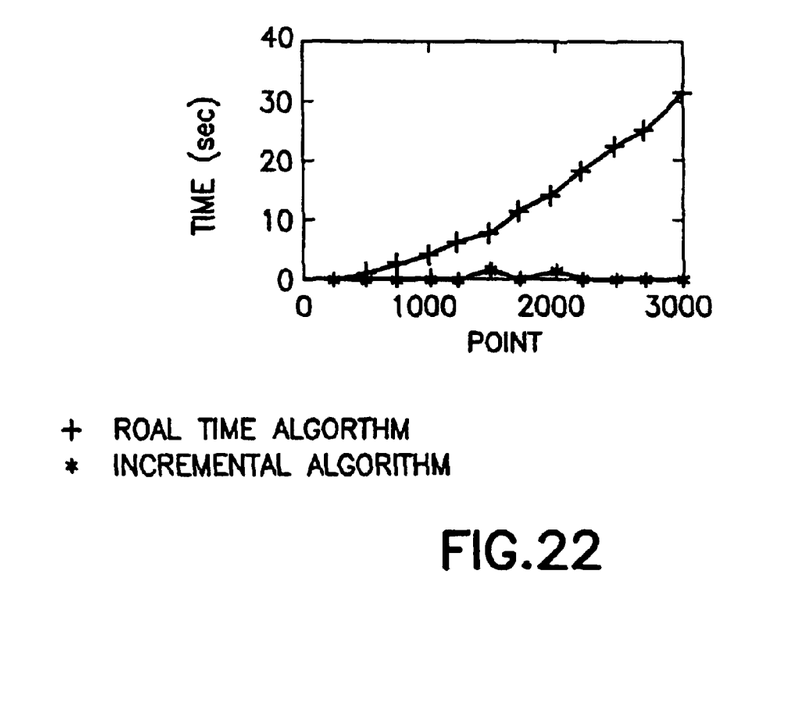
FIG. 22 shows a graph including the label position determining time of real-time determining method and that of the increment determining method when the display scale of the point set is 2S in FIG. 21.

As far as the time consumption of determining method concerned, it can be divided into two parts for discussing. First real-time point label position determining method. Rule 2, which is added into determining method, dramatically reduces computing time. For example, it takes 220 seconds to run the real time point label position determining method with the three rules of Wagner and only 1 second after adding Rule 2 (the consumption of our determining time in the lab is larger than that in the paper of Wagner, one reason is that, in order to simulate browsing the practical condition of WebGIS map, we determine collision in real time instead of directly inputting collision figure; another reason is that, program in JAVA is slower than that in C, and our computer for testing is slower). FIG. 21 shows the time consumption of point label determining method in real-time. Though it is acceptable for a single user, it is obvious too slow for the applications of WebGIS. FIG. 22 shows the time consumption of the point set in FIG. 21 under the scale 2S employing both real-time determining method and increment determining method. Obviously, compared with real-time determining method, the time consumption of increment determining method can be ignored, completely meeting the requirements of multiple users at the same time.

Figure 23:
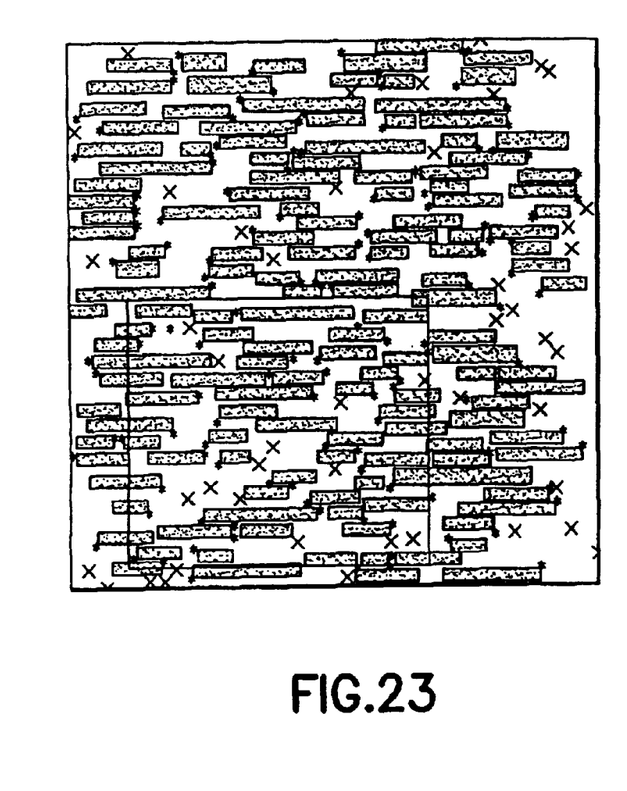
FIG. 23 shows a diagram of initial label results of certain point set.
Figure 24:
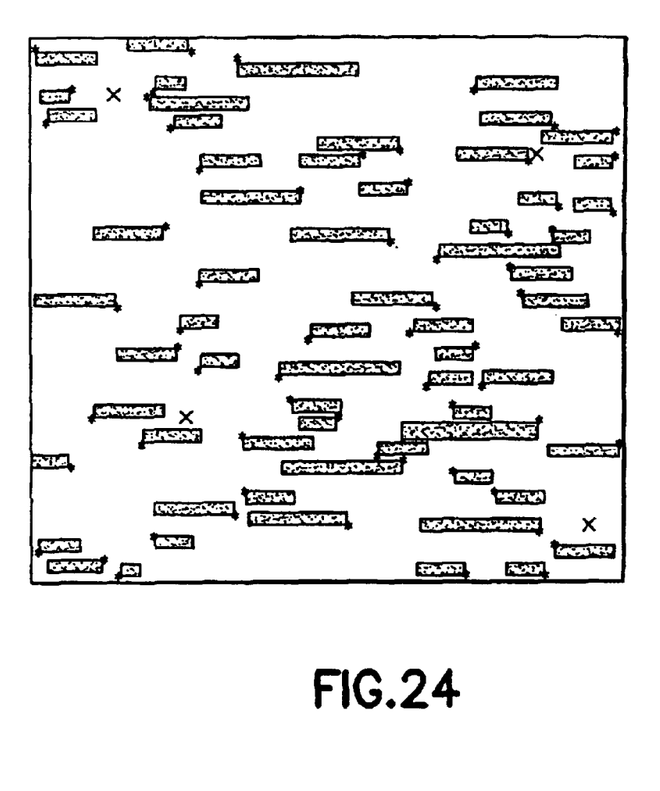
FIG. 24 shows the increment label result of sub-area of FIG. 23 with the display scale 2S.

The label result of some point set is provided too. FIGS. 23 and 24 are results using real-time point label position determining method of the point set and increment determining method of half the point set respectively. The points expressed by x in figures stand for the unlabeled points. Obviously, the decrease of scale make many points labeled, which are originally unlabeled.

Thus the present invention provides a point label determining method suitable for the massive service requests simultaneously, associated with the main controversy of labeling a map in WebGIS on the basis of conversation pattern service, wherein the increment determining method largely reduces time consumption, and improves real-time response extend. Based on this method, a quick area label system can be obtained to fulfill the whole label process of WebGIS.

Also, a determining method and a system for labeling points in the web geographical information system according to the embodiments of the present invention are described with reference to the drawings. Though the present invention describes applications for the web geographical information system, it is obvious to apply the idea of the present invention to label display all kinds of maps, such as circuit diagram and mechanical diagram. These equivalent replacements are included in the scope of the present invention. In case that does not go beyond the spiritual essential and scope of the present invention, it is obvious for those skilled in the art to amend and change the present invention a lot. All the amendment and change are covered by the scope of the present invention. The protection scope of the present invention should be defined by the attaching claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for determining point label placement in a network system wherein a terminal unit requests a point label placement determining device to provide a map display service in a specific display scale via a communication link, and the point label placement determining device sends map information on the specific display scale to the terminal unit for displaying a map, the method comprising:

determining and saving at least one set of static point label placement results in at least one predetermined scale;

responding to an application by the terminal unit for the display service displaying points and labels on the map, and comparing the specific display scale with at least one predetermined scale;

if the display scale of the terminal unit is identical to a predetermined scale, sending the at least one static point label placement at this predetermined scale to the terminal unit;

if the specific display scale of the terminal unit is different from the at least one predetermined scales of the saved static point label placement, the point label placement determining a device determining new point label placement in the specific display scale of the terminal unit by an incremental point label placement method according to the saved static point label placement results, and sending the determined new point label placement to the terminal unit, wherein:

if the display scale of the terminal unit is different from any predetermined scales of the static point label placements saved in the point label placement determining device, further comprising selecting a maximal predetermined scale in the scales that is smaller than the display scale of the terminal unit, and determining the label placement based on the results of the predetermined point label placement corresponding to the selected predetermined scale by the incremental label placement method;

if the display scale of the terminal unit is smaller than all the predetermined scales saved in the point label placement determining device, further comprising determining the label placement displayed on the terminal unit based on the results of predetermined point label placement corresponding to a smallest predetermined scale.

2. The method of claim 1, wherein each point on the map has a plurality of candidate label positions, the static point label placement determining step comprising:

step 1: checking whether any candidate label position of each point is beyond a label area, if there is a candidate label position that is beyond the label area, then this candidate label position is deleted from the results set;

step 2: checking whether there are other points that are within the remaining candidate label positions of a point, if there are any other points, then this candidate label position is deleted from the results set; and wherein when calculating a conflict between the candidate label positions of any points in step 2, only the conflict between the candidate label position of a particular point and the candidate label position of other points located in a neighborhood region of the particular point is calculated; the neighborhood region is a rectangle area with 4 times a maximal length and a maximal width of all labels on the map as its sides, and with the particular point as the center of the region.

3. The method of claim 1, wherein said map is a map taken from a group of maps consisting of: a geographical map, a circuit diagram and a mechanical drawing, and wherein said label is taken from a group of labels consisting of: a label in a geographical map, a label in a circuit diagram and a label in a mechanical drawing.

4. The method of claim 1, further comprising:

a. if said display scale of the terminal unit is larger than said predetermined scale, then processing according to the following three conditions:

a1) if a label position of a particular point is within a sub-region displayed on the terminal unit, adding the particular point into a point set that can be labeled;

a2) if a label position of a the particular point is beyond the sub-region displayed on the terminal unit, replacing this label position with other candidate label positions of the said particular point according to a predetermined priority; if a candidate label position is within the sub-region displayed on the terminal unit, there is no other point within the candidate label position, and it has no effect on the label position of it's neighborhood points, then adding said particular point to the point set which can be labeled; otherwise add said particular point to the point set which can not be labeled;

a3) using the step in a2) to determine the label position for the point which cannot be labeled in the predetermined scale; and b. if said display scale of the terminal unit is less than all said predetermined scale, then determining the label position of points by a static point label placement determining step.

5. A system for determining label placement of points on a map, comprising:

a point label placement determining device;

a terminal unit;

a communication link between the point label placement determining device and the terminal unit;

storage means for storing the data of static point label placement on the whole map on one or more predetermined scales;

comparing means for comparing a display scale of the terminal unit with said predetermined scales;

selecting means for selecting an appropriate predetermined scale as the base for determining incremental label placements; and incremental label placement determining means for determining the point label placement on the display scale that is different from said predetermined scales, wherein if said comparing means determines that said display scale is identical with one of the predetermined scales, said selecting means selects said one of the predetermined scales; if said display scale is different from any of the predetermined scales, and there are predetermined scales which are smaller than said display scale, said selecting means selecting the maximal predetermined scale from the predetermined scales that are smaller than said display scale; otherwise, said selecting means selects the smallest predetermined scale.

6. The system of claim 5, wherein said terminal unit comprising:
   a communication port for exchanging data with said point label placement determining device;
   storage means for storing label position data from said point label placement determining device;
   a controller for transmitting the display scale to said point label determining device, requiring said point label determining device to determine the label positions for displaying, and controlling the display according to the label positions from said point label determining device; and
   a display means for displaying points and their labels in the scale designated by said terminal unit according to the label position data stored in the storage means.

7. The system of claim 5, wherein said incremental label placement determining device includes a judging means, which makes a judgment according to the following conditions:
   a. if said predetermined scale selected by said selecting means is less than said display scale of the terminal unit, then processing according to the following three conditions:
      a1) if a label position of a point is within a sub-region displayed on the terminal unit, adding the point into 9 point set that can be labeled;
      a2) if a label position of a point is beyond the sub-region displayed on the terminal unit, replace this label position with other candidate label positions of the same point according to a predetermined priority; if a candidate label position is within the sub-region displayed on the terminal unit, there is no any other point within the candidate label position, and it has no effect on the label position of it's neighborhood points, then adding this point to the point set which can be labeled; otherwise add this point to the point set which can not be labeled;
      a3) using the step in a2) to determine the label position for the point that cannot be labeled in the predetermined scale; and
   b. if said display scale of the terminal unit less than all said predetermined scales, then determining the label position of points by a static point label placement determining method.

8. A point label placement determining device, comprising:
   storage means for storing data of static point label placement on a whole map in at least one predetermined scale;
   comparing means for comparing a display scale from a terminal unit with said at least one predetermined scale in response to a service request from the terminal unit;
   selecting means for selecting an appropriate predetermined scale as a base for determining an incremental point label placement;
   incremental label placement determining means for determining the point label placement in a display scale that is different from said at least one predetermined scale, wherein if said comparing means determines that said display scale is identical with one of the at least one predetermined scale, said selecting means selects said one of the at least one predetermined scale; if said display scale is different from said at least one predetermined scale, and there are predetermined scales which are smaller than said display scale, said selecting means selects a maximal predetermined scale from said at least one predetermined scale being smaller than said display scale; otherwise, said selecting means selects a smallest predetermined scale.

9. The point label placement determining device of claim 8, wherein said incremental paint label placement determining device includes a judging means for making a judgment according to the following conditions:
   a. if said at least one predetermined scale selected by said selecting means is less than said display scale, then processing according to the following three conditions:
      a1) if a label position of a point is within a sub-region displayed on the terminal unit, adding the point into a point set that can be labeled;
      a2) if a label position of a point is beyond the sub-region displayed on the terminal unit, replace this label position with other candidate label positions of the same point according to a predetermined priority if a candidate label position is within the sub-region displayed on the terminal unit, there is no any other point within the candidate label position, and it has no effect on the label position of its neighborhood points, then adding this point to the point set which can be labeled; otherwise adding this point to the point set which can not be labeled;
      a3) using the step in a2) to determine the label position for the point that cannot be labeled in the predetermined scale;
   b. if said determining display scale of the terminal unit is smaller than all predetermined scales, then determining the label position of points employing a static point label placement determining method.

10. An article of manufacture comprising a computer usable medium having computer readable program code means embodied therein for causing determination of point label placement, the computer readable program code means in said article of manufacture comprising computer readable program code means for causing a computer to effect the steps of claim 1.

11. A program storage device readable by machine, tangibly embodying a program of instructions executable by the machine to perform method steps for determining point label placement, said method steps comprising the steps of claim 1.

12. A computer program product comprising a computer usable medium having computer readable program code means embodied therein for causing determination of point label placement, the computer readable program code means in said computer program product comprising computer readable program code means for causing a computer to effect the functions of claim 5.

13. A computer program product comprising a computer usable medium having computer readable program code means embodied therein for causing label placement, the computer readable program code means in said computer program product comprising computer readable program code means for causing a computer to effect the functions of claim 8.

* * * * *